US012796760B2

(12) United States Patent
Ahn et al.

(10) Patent No.: US 12,796,760 B2
(45) Date of Patent: Nov. 17, 2026

(54) AUTOMATIC GENERATION OF PATTERN FROM MEASURED PARAMETERS

(71) Applicant: CLO Virtual Fashion Inc., Seoul (KR)

(72) Inventors: Hong Hyun Ahn, Seoul (KR); Phoebe Gatta, New York, NY (US)

(73) Assignee: CLO Virtual Fashion Inc., Seoul (KR)

( * ) Notice: Subject to any disclaimer, the term of this patent is extended or adjusted under 35 U.S.C. 154(b) by 191 days.

(21) Appl. No.: 18/732,616

(22) Filed: Jun. 4, 2024

(65) Prior Publication Data

US 2024/0315371 A1 Sep. 26, 2024

Related U.S. Application Data

(63) Continuation of application No. PCT/KR2023/006082, filed on May 3, 2023.
(Continued)

(30) Foreign Application Priority Data

May 3, 2023 (KR) ........................ 10-2023-0057947

(51) Int. Cl.

*A41H 3/00* (2006.01)
*G06T 7/73* (2017.01)
*G06T 11/23* (2026.01)

(52) U.S. Cl.

CPC ............... *A41H 3/007* (2013.01); *G06T 7/73* (2017.01); *G06T 11/23* (2026.01); *G06T 2200/24* (2013.01); *G06T 2210/16* (2013.01)

(58) Field of Classification Search

CPC ........... A41H 3/007; G06T 7/73; G06T 11/23; G06T 2200/24; G06T 2210/16
See application file for complete search history.

(56) References Cited

U.S. PATENT DOCUMENTS 4,916,624 A * 4/1990 Collins .................. A41H 3/007 706/904
2007/0009138 A1 * 1/2007 Ishikawa ................ G06V 10/46 382/203
(Continued)

FOREIGN PATENT DOCUMENTS

CN 112137215 A * 12/2020 ............... A41H 3/08
KR 10-2002-0095313 A 12/2002
(Continued)

OTHER PUBLICATIONS

European Search Report of the corresponding EP Application No. 23799692.1 mailed on Dec. 5, 2025.
(Continued)

*Primary Examiner* — Xin Sheng
(74) *Attorney, Agent, or Firm* — WTA IP Law P.C.

(57) ABSTRACT

Embodiments relate to generating a pattern of a garment involves receiving measurement parameters of a garment. Upon receiving measurement parameters, points that are connected to form an outline of the pattern are generated based on the measurement parameters and pattern information. These points may be assigned to different types depending on which part of the pattern they belong. Locations of points of references are determined to generate the pattern in accordance with the measurement parameters. The points are connected by a straight line or a curved line to define the pattern.

16 Claims, 13 Drawing Sheets

Related U.S. Application Data

(60) Provisional application No. 63/337,866, filed on May 3, 2022.

(56) References Cited

U.S. PATENT DOCUMENTS

| | | | | |
|---|---|---|---|---|
| 2013/0305547 | A1* | 11/2013 | Grove | A41H 3/007<br>33/17 A |
| 2017/0273383 | A1* | 9/2017 | deGuzman | G06Q 30/0641 |

FOREIGN PATENT DOCUMENTS

| | | | |
|---|---|---|---|
| KR | 10-1672299 | B1 | 11/2016 |
| KR | 10-2020-0004570 | A | 1/2020 |

OTHER PUBLICATIONS

International Search Report of PCT/KR2023/006082 mailed on Aug. 7, 2023.

Written Opinion of ISA of PCT/KR2023/006082 mailed on Aug. 7, 2023.

* cited by examiner

AUTOMATIC GENERATION OF PATTERN FROM MEASURED PARAMETERS

CROSS-REFERENCE TO RELATED APPLICATIONS

This application is a bypass continuation of PCT International Patent Application No. PCT/KR2023/006083, filed on May 3, 2023, which claims priority to U.S. Patent Application No. 63/337,866, filed on May 3, 2022 and Republic of Korea Patent Application No. 10-2023-0057947, filed on May 3, 2023, which are incorporated by reference herein in their entirety.

TECHNICAL FIELD

The present disclosure relates to generating of a pattern in a garment by automatically processing measurement parameters.

BACKGROUND ART

To facilitate designing of new garments, many companies or individuals have a pattern block library including a plurality of pattern blocks. The pattern blocks are patterns manufactured to suit a previously manufactured clothing style. The pattern blocks may generally be used to efficiently build new style of garments while reducing pattern modifications. However, generating a pattern block library with a plurality of pattern blocks may involve a lot of time and resources for preparation.

SUMMARY

Embodiments relate to a computer-implemented method of automatically generating a pattern of a garment. A pattern hem length, a pattern height, a neckline parameter, and a sleeve line parameter are received. A first line representing a hem of the pattern and having a length corresponding to the received pattern hem length is generated. A second line having a length corresponding to the received pattern height is generated. The second line starts from a point of the first line and forms an angle relative to the first line. A neckline starting from an end point of the second line and having a configuration derived from the received neckline parameter is generated. At least one sleeve line having a configuration derived from the received sleeve line parameter is generated. The pattern is formed to include the first line, the neckline and the at least one sleeve line. The formed patter is displayed.

In one or more embodiments, user interface elements for receiving the pattern hem length, the pattern height, and the sleeve parameter are displayed. The pattern hem length, the pattern height, and the sleeve parameter are received via the user interface elements. An update to at least one of the pattern hem length, the pattern height, and the sleeve parameter is received responsive to displaying the formed pattern. An updated pattern is formed according to the received update. The updated pattern is displayed.

In one or more embodiments, the neckline parameter is an across shoulder length, a shoulder slope length, a neck depth or a neck opening. The sleeve line parameter is an armhold length, an across length or an across chest length.

In one or more embodiments, the pattern height is (i) a high point shoulder (HPS) length representing a length from the hem to a highest point of the pattern corresponding to a shoulder of a wearer or (ii) a center height representing a length from the hem to a center of the neckline.

In one or more embodiments, the neckline is generated by determining a location separated from a high point shoulder (HPS) by a first distance in a first direction and separated from the HPS by a second distance in a second direction as a center point of the neckline when an HPS length is used as the pattern height. The first distance is determined from a neck opening and the second distance is determined from a neck depth. The neckline is generated from the determined center point.

In one or more embodiments, the neckline is generated by determining a location separated from a center of the neckline by a first distance in a first direction and separated from the center of the neckline by a second distance in a second direction as an end point of the neckline that contacts a shoulder line when a center height is used as the pattern height. The first distance is determined from a neck opening and the second distance is determined from a neck depth. The neckline is generated from the determined end point.

In one or more embodiments, the sleeve line is generated by generating a shoulder slope line to extend from an end point of the neckline, and generating a sleeve line to extend from an end point of the shoulder slope line with a configuration determined by the sleeve line parameter.

In one or more embodiments, the sleeve line is generated by determining a location separated from the end point of the shoulder slope line by a first distance in a first direction, and separated from the end point of the shoulder slope line by a second distance in a second direction as an end point of the sleeve line. The first distance is determined from an across shoulder length and an across chest length. The second distance is determined from the across shoulder length, the across chest length, and an armhole length. The sleeve line is generated from the end point of the sleeve line.

In one or more embodiments, responsive to receiving an across chest length at a predetermined distance away from an armhole of the pattern as the neckline parameter, a distance from the armhole to another armhole at an opposite side is estimated based on the across chest length and the pattern height. The estimated distance based on the armhole length is verified. The distance from the armhole to the other armhole is re-estimated according to the verification.

In one or more embodiments, a curvature of at least one of the neckline or the sleeve line is adjusted by manipulating at least one adjusting point.

In one or more embodiments, the curvature is adjusted by determining whether an angular constraint is satisfied using the at least one adjusting point. The angular constraint indicates that a straight line generated by the at least one adjusting point entering an end point of the neckline or the sleeve line and an outline of the pattern meet perpendicularly.

In one or more embodiments, a length of at least one of the neckline or the sleeve line is adjusted by manipulating at least one adjusting point.

In one or more embodiments, the length of at least one of the neckline or the sleeve line is adjusted by determining whether a length constraint is satisfied. The length constraint indicates that the length of at least one of the neckline or the sleeve line matches a length of a neckline or a sleeve line of another pattern combined with the pattern.

Embodiments also related to automatically generating a pattern of a garment by processing a sleeve hem length, a sleeve length and a cap parameter. The sleeve hem length, the sleeve length and the cap parameter are received. A hem line of a sleeve of the pattern is generated. The hem line has a length corresponding to the sleeve hem length. A center line perpendicular to the hem line and having a length corresponding to the sleeve length is generated. A cap line is generated. The cap line starts from an end point of the center line and has a length derived from the cap parameter. The pattern is formed to include the hem line and the cap line. The formed patter is displayed.

In one or more embodiments, the cap line is generated by determining a location separated by a first distance from the end point of the center line in a first direction and separated from the end point of the center line by a second distance in a second direction as an end point of the cap line. The first distance is determined from a bicept width and the second distance is determined from a cap height. The cap line is generated from the end point of the cap line.

In one or more embodiments, the cap parameter is a cap height or a biceps width.

Embodiments also relate to a computer readable storage medium storing instructions thereon. The instructions when executed by a processor cause the processor to automatically form and display a pattern based on a pattern hem length, a pattern height, a neckline parameter, and a sleeve line parameter.

Embodiments also relate to a pattern of a garment generated by an automatic process. In the automatic process, a pattern hem length, a pattern height, a neckline parameter, and a sleeve line parameter are received. A first line with a length corresponding to the received pattern hem length is received. The first line represents a hem of the pattern. A second line has a length corresponding to the received pattern height. The second line starts from a point of the first line and forms an angle relative to the first line. A neckline starting from an end point of the second line and having a configuration derived from the received neckline parameter is generated. At least one sleeve line having a configuration derived from the received sleeve line parameter is generated. The pattern is formed to include the first line, the neckline and the at least one sleeve line.

DETAILED DESCRIPTION

Figure 1:
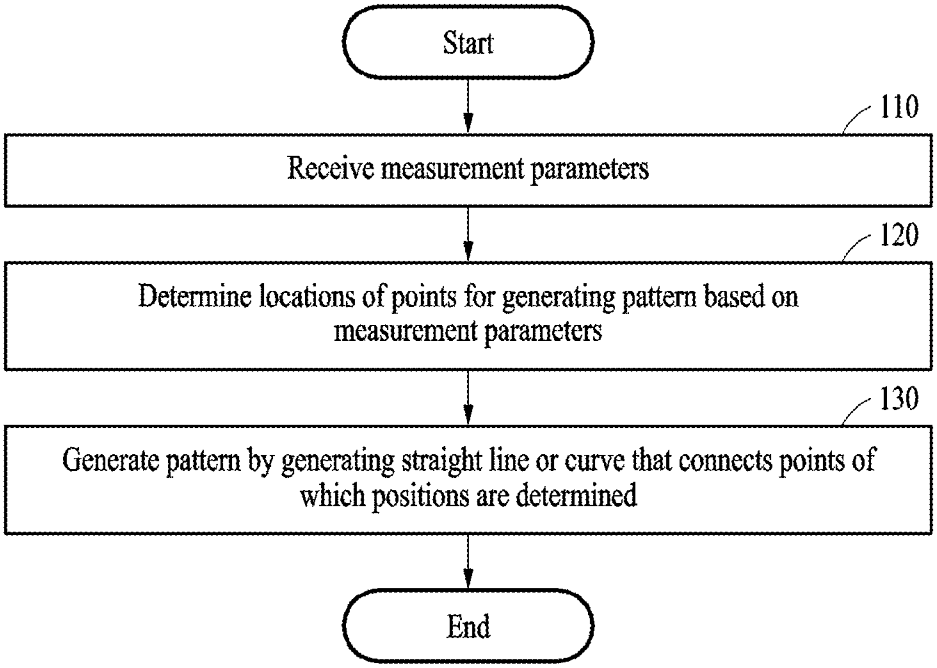
FIG. 1 is a flowchart illustrating a method of generating a pattern based on measurement parameters, according to an embodiment.

The following structural or functional descriptions are exemplary to merely describe the embodiments, and the scope of the embodiments is not limited to the descriptions provided in the present specification.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more of other features, integers, steps, operations, elements, components, and/or groups thereof.

Hereinafter, examples will be described in detail with reference to the accompanying drawings. In the drawings, like reference numerals are used for like elements.

FIG. 1 is a flowchart illustrating a method of generating a pattern based on a measurement parameter, according to an embodiment. In operation 110, a simulation device 1100 receives measurement parameters. The measurement parameters may include a plurality of garment measurements that define a garment. The measurement parameters may be values stated in a garment specification sheet or a measurement table. The measurement parameters may be received via a user interface displayed on a screen on of the simulation device 1100, for example, as described below in detail with reference to FIG. 10.

In operation 120, the simulation device 1100 may determine locations of points that are used as references for generating a pattern based on measurement parameters. The measurement parameters refers to measurements taken from garments or their patterns. A garment or their patterns may be generated by defining points separated by distances and lines connecting these points.

The measurement parameters used may vary depending on the type of a pattern block. For example, when the pattern block is a T-shirt torso front (or back) pattern, the measurement parameters may include at least one of a pattern hem length, a pattern height, an across shoulder length, a shoulder slope length, a neck depth, a neck opening, an across length, an across chest length (e.g., a length corresponding to a half of a chest circumference), and an armhole length. These are merely examples, and some of these measurement parameters may be omitted or other measurement parameters may be used instead. In another example, when the pattern block is a T-shirt sleeve pattern, the measurement parameters may include at least one of a sleeve hem length, a sleeve length, a cap height, a biceps width, and a cap opening. Other pattern blocks may be used for different patterns of garments such as pants and skirts, and different measurement parameters may be used to define these garments.

In operation 130, a pattern is generated using a straight line or a curve that connects points with their locations determined. The simulation device 1100 may generate a plurality of lines based on locations of points determined based on the measurement parameters. The simulation device 1100 may generate a pattern by determining at least a part of the plurality of lines as an outline of the pattern. A line connecting two points may be a straight line, a curve, or a combination thereof.

A pattern may be formed to include the lines and points determined according to the measurement parameters. The formed pattern may be displayed to a user on the screen of the simulation device 1100, as described below in detail with reference to FIG. 10.

In one or more embodiments, the user may update at least one of the measurement parameters using the user interface. In response, the pattern may be updated dynamically and displayed on the screen of the user interface.

The number of points and types of lines connecting the points may differ depending on the type of pattern block. A detailed method of generating the pattern depending on the pattern block is described in detail below with reference to the following drawings.

Figure 2:
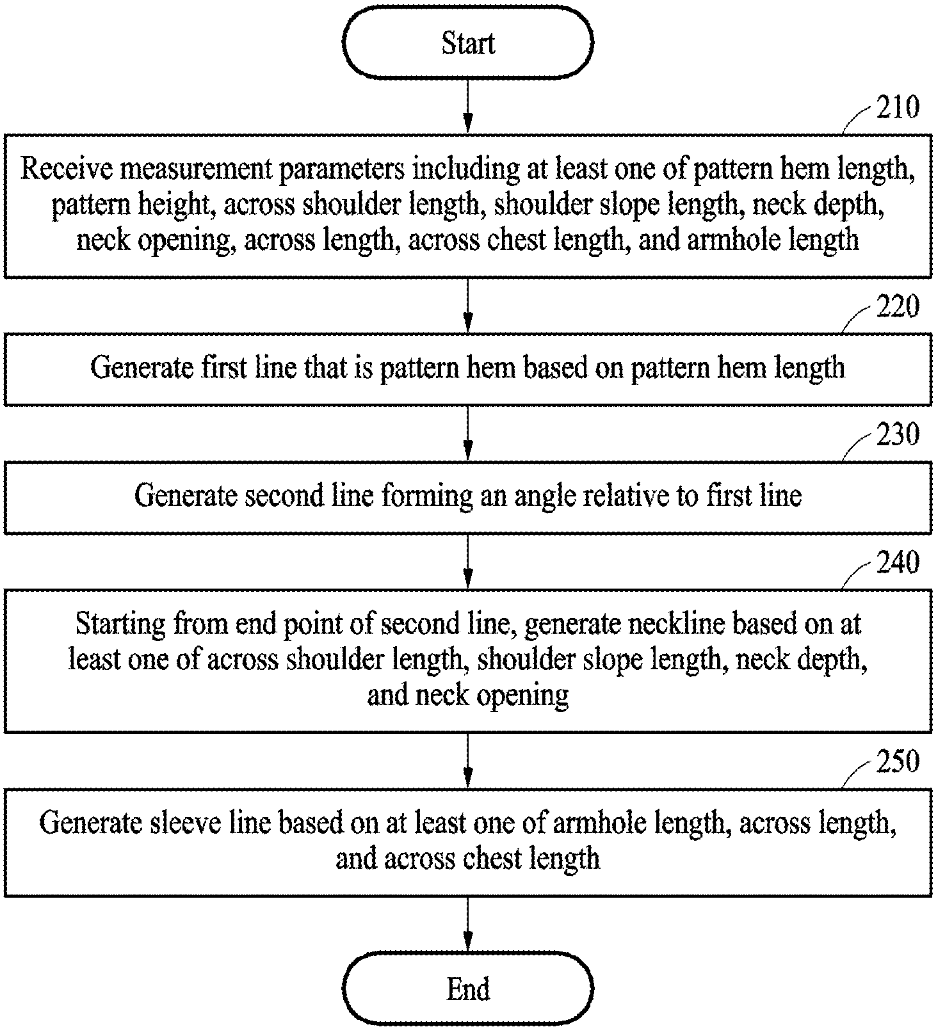
FIG. 2 is a flowchart illustrating a method of generating a pattern of a first pattern block, according to an embodiment.

FIG. 2 is a flowchart illustrating a method of generating a pattern corresponding to a first pattern block, according to an embodiment. The first pattern block in the example of FIG. 2 is a T-shirt front pattern, but different pattern block may be used instead.

Figure 10:
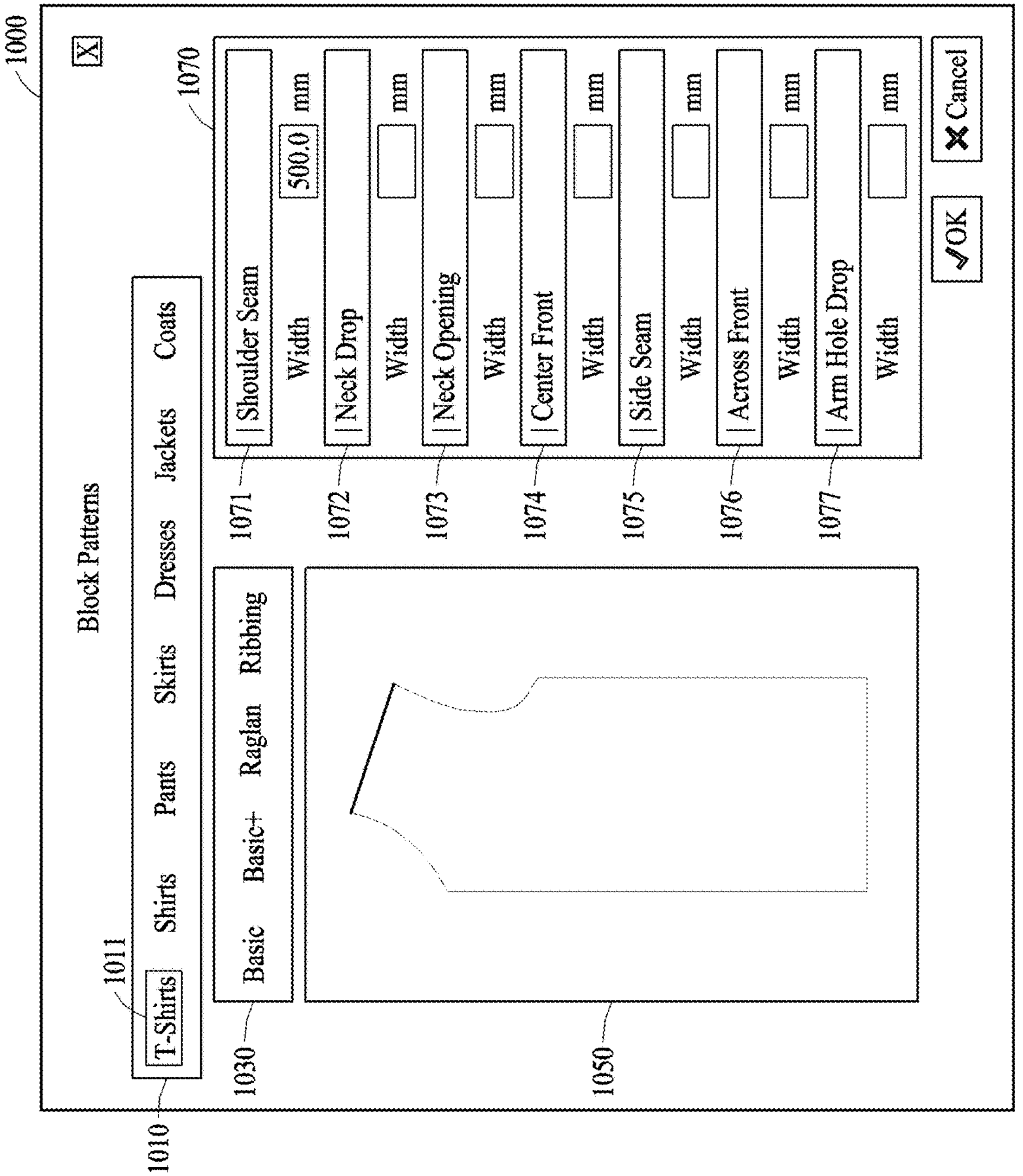
FIG. 10 is a diagram illustrating a user interface for receiving measurement parameters, according to an embodiment.

In operation 210, measurement parameters including at least one of a pattern hem length, a pattern height, a neckline parameter, and a sleeve line parameter are received. The neckline partaker is used for defining the configuration of the neckline in the pattern, and may include one or more of an across shoulder length, a shoulder slope length, a neck depth and a neck opening. The sleeve line parameter is used for defining the configuration of a sleeve line, and may include one or more of an across length, an across chest length, and an armhole length. These measurement parameters may be received from a user through a user interface (for example, as shown in FIG. 10).

Figure 3:
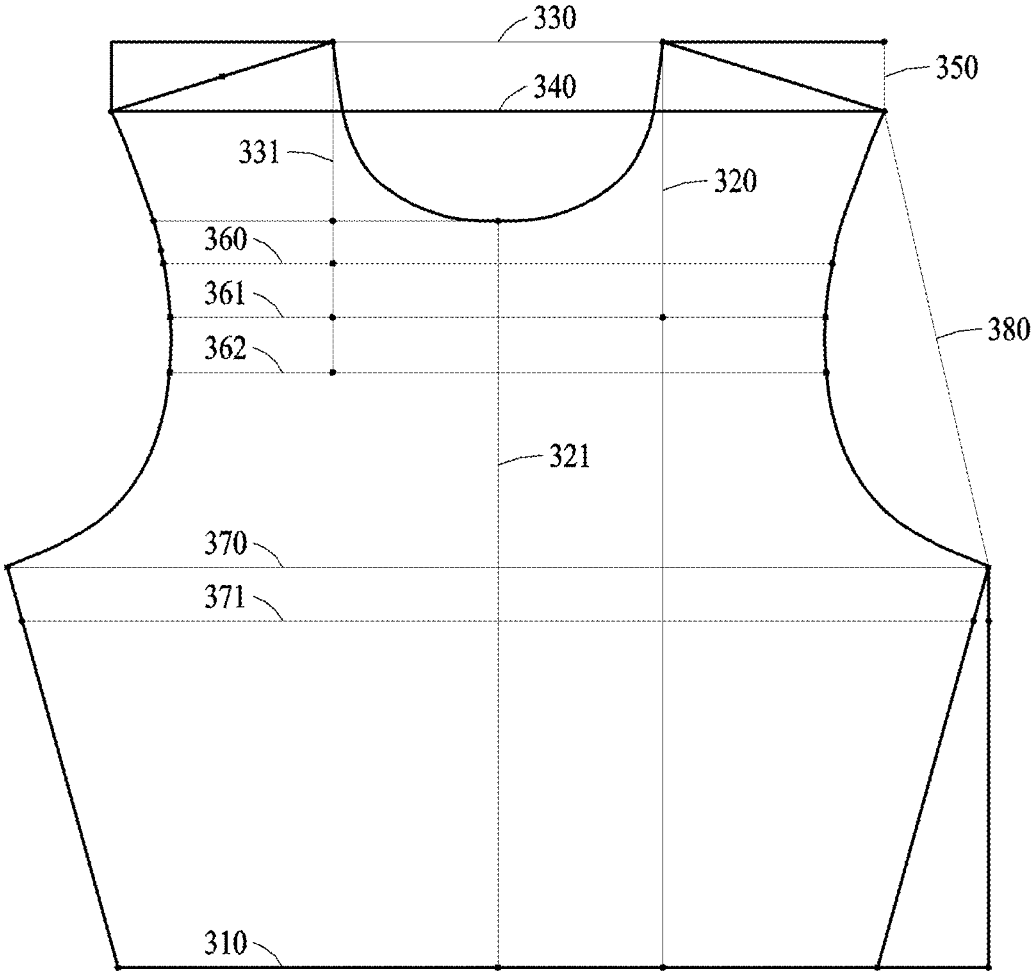
FIG. 3 is a diagram illustrating a measurement parameter corresponding to the first pattern block, according to an embodiment.

The pattern hem length may include, for example, a hem sweep. The hem sweep refers to the hem circumference or the hem length of a garment such as skirt, dress, coat, or jacket. Referring to FIG. 3, the pattern hem length corresponds to the length of line 310.

The pattern height refers to a distance from a pattern hem to a center of a high point shoulder (HPS) or a neckline of a pattern. The HPS refers to a highest point on the pattern covering a shoulder of the wearer. Referring to FIG. 3, when a distance from the pattern hem to the HPS of the pattern is used as a pattern height, the pattern height corresponds to the length of line 320. The HPS length of a pattern refers to a distance from the pattern hem to the HPS of the pattern. In another example, when a distance from the pattern hem to the center of the neckline is used as a pattern height, the pattern height corresponds to the length of line 321. The center height refers to a distance from the pattern hem to the center of the neckline.

The across shoulder length refers to a horizontal length between the left shoulder and the right shoulder. Referring to FIG. 3, the across shoulder length corresponds to the length of line 340.

The shoulder slope length is a length of a shoulder slope line. For example, the shoulder slope length may refer to a shoulder slope height. Referring to FIG. 3, the shoulder slope length corresponds to the height of line 350.

The neck depth refers to a vertical distance between the highest point of the neckline and the lowest point of the neckline. Referring to FIG. 3, the neck depth correspond to the length of line 331 between line 330 and the lowest point of the neckline. Line 331 connects the two highest points of the sleeve lines.

The neck opening refers to a horizontal distance from an end point of the left neckline to an end point of the right neckline. Referring to FIG. 3, the neck opening corresponds to the length of the line 330.

The across length refers to the length of a line that connects a point on the left sleeve line and a point on the right sleeve line. For example, when a pattern block is a front pattern of a T-shirt, the across length may be an across front length, and when a pattern block is a T-shirt back pattern, the across length is an across back length. Referring to FIG. 3, the across length corresponds to at least one of lengths of lines 360, 361, and 362. According to an embodiment, the simulation device 1100 may generate a pattern using at least one of the lengths of the lines 360, 361, and 362.

The across chest length is a length determined based on a distance between a left armhole and a right armhole. Referring to FIG. 3, the across chest length may be the length of one of lines 370 and 371. According to an embodiment, the simulation device 1100 may generate a pattern using at least one of the lengths of the lines 370 and 371. The line 371 may positioned 1 inch below the armhole.

The armhole length refers to a length obtained by connecting both end points of a sleeve line in a straight line. Referring to FIG. 3, the armhole length corresponds to the length of line 380.

In operation 220, a first line that is a pattern hem is generated based on the pattern hem length. The length of the first line may correspond to the pattern hem length. Referring to FIG. 3, the first line generated by the simulation device 1100 corresponds to the line 310.

In operation 230, a second line forming an angle (e.g., 90 degrees) relative to the first line is generated based on the pattern height. The length of the second line corresponds to the pattern height. Referring to FIG. 3, the second line may correspond to at least one of the line 320 and the line 321.

In operation 240, a neckline is generated by extending from an end point of the second line based on at least one of the across shoulder length, the shoulder slope length, the neck depth, and the neck opening. The detailed process of generating the neckline is described below with reference to FIGS. 4A and 4B.

In operation 250, a sleeve line may be generated based on at least one of the armhole length, the across length, and the across chest length. The detailed process of generating the sleeve line is described in detail below with reference to FIGS. 5A and 5B.

FIG. 3 is a diagram illustrating measurement parameters corresponding to the first pattern block, according to an embodiment. Since the measurement parameters corresponding to the first pattern block are described above with reference to FIG. 2, a detailed description thereof is omitted for the sake of brevity.

Figure 4A:
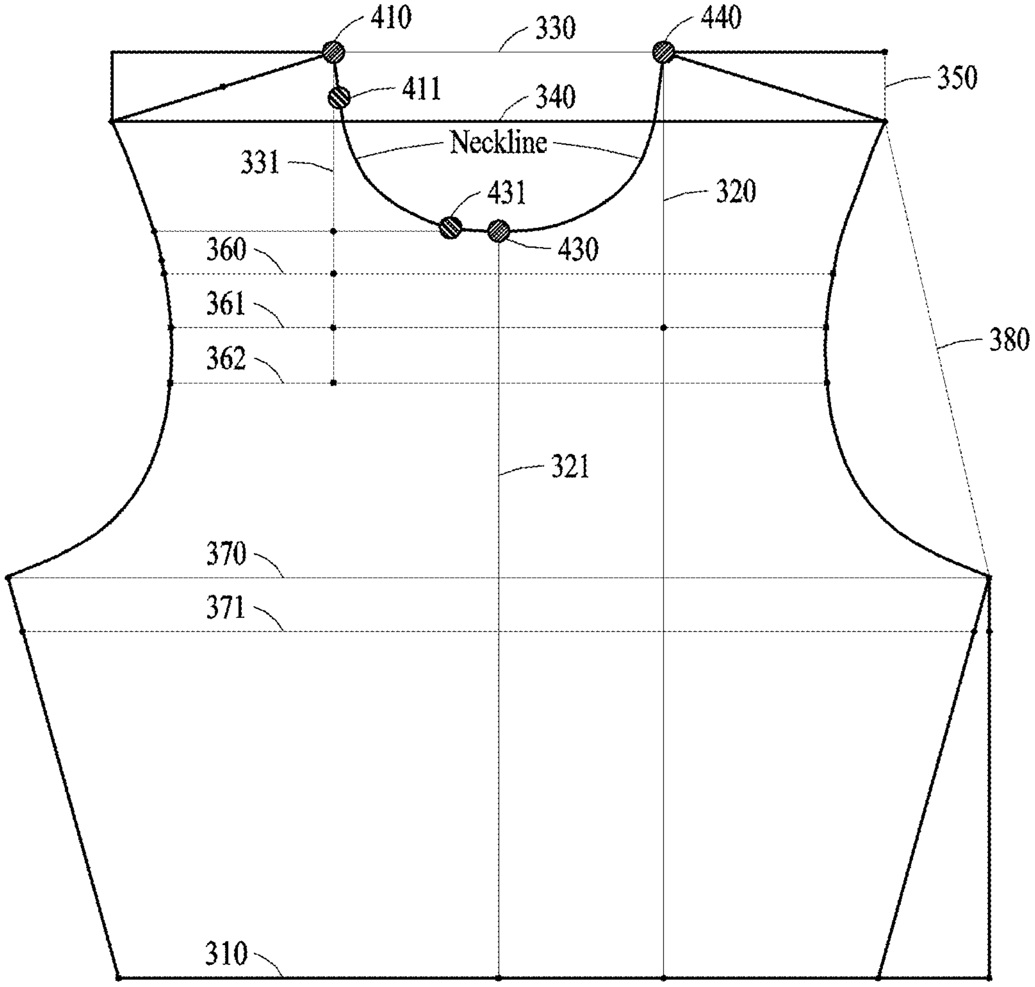
FIGS. 4A and 4B are diagrams illustrating a process of generating a neckline of a pattern, according to an embodiment.
Figure 4B:
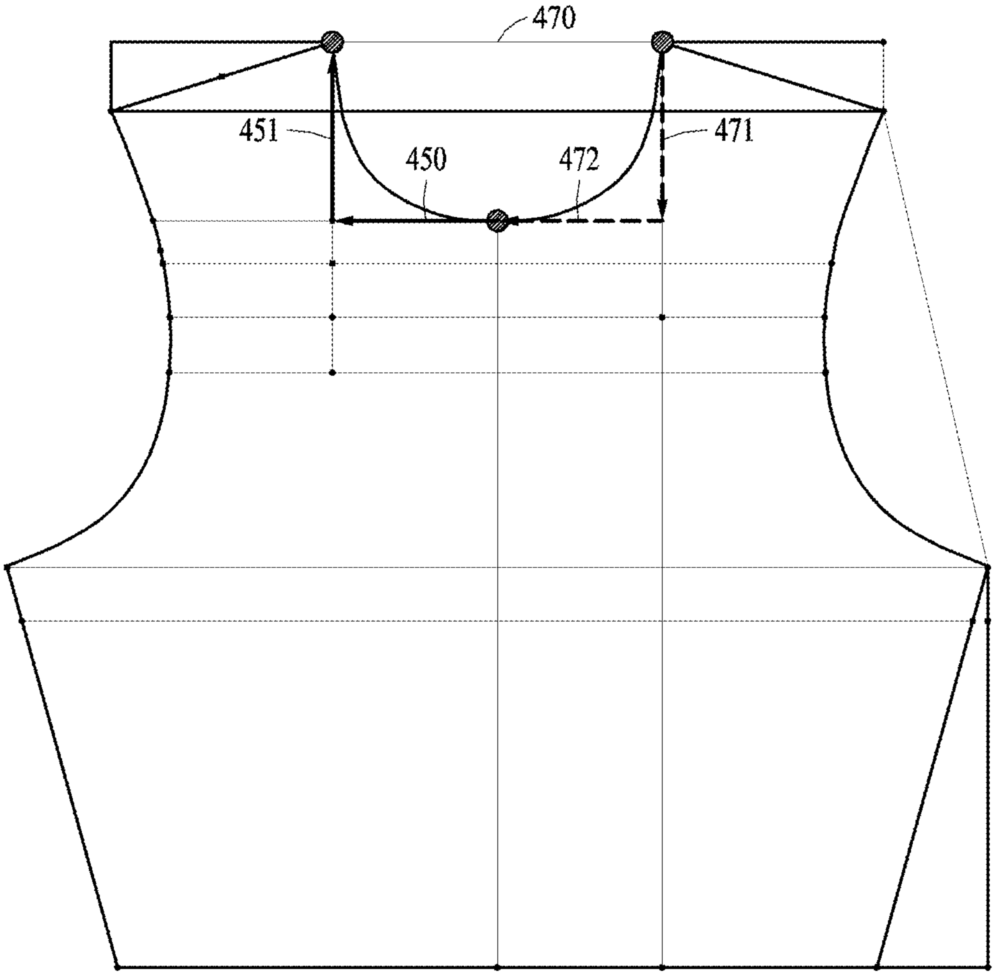

FIGS. 4A and 4B are diagrams illustrating the process of generating a neckline, according to an embodiment. The simulation device 1100 may generate the neckline line starting from an end point of the second line. Using at least one of the across shoulder length, the shoulder slope length, the neck depth, and the neck opening, the simulation device 1100 may generate points at a predetermined distance away from the end point of the second line and generate the neckline by connecting the points.

When the second line is the line 320, the simulation device 1100 may determine positions of points for generating the neckline, starting from an end point 440 of the second line. When the second line is the line 320, the second line may be generated based on the HPS length. Specifically, the simulation device 1100 may generate a center point 430 of the neckline at a location separated by a first distance 472 from the end point 440 of the second line in a first direction (e.g., in a horizontal direction) and separated by a second distance 471 from the end point 440 of the second line based on the neck depth in a second direction (e.g., in a vertical direction). The simulation device 1100 may then generate the neckline by connecting the center point 430 and the end point 440 of the second line. The neckline may be configured as a straight line, a curve, or a combination thereof.

The first distance may be, for example, a value obtained by multiplying the neck opening by a coefficient having a value between 0 and 1. The second distance may be, for example, a value obtained by multiplying the neck depth by a coefficient between 0 and 1.

When the second line is the line 321, the simulation device 1100 may determine locations of points for generating the neckline from the center point 430 of the neckline. When the second line is the line 321, the second line may be generated based on the center height. The simulation device 1100 may generate an end point 410 of the neckline that is in contact with a shoulder line at a location separated by a first distance 450 derived from the neck opening in the first direction (e.g., in the horizontal direction) and separated by a second distance 451 corresponding to the neck depth in the second direction (e.g., in the vertical direction). The simulation device 1100 may generate the neckline by connecting the end point 410 of the second line and the center point 430 of the neckline. The neckline may be configured as a straight line, a curve, or a combination thereof.

In one or more embodiments, the simulation device 1100 adjusts the curvature of a line of a pattern according to the placement of adjusting point 411 or 431. The line of the pattern may include at least one of the neckline and the sleeve line. The simulation device 1100 may determine whether an angular constraint is satisfied using at least one adjusting point for adjusting the curvature of the line of the pattern. The angular constraint may indicate that a straight line generated by at least one adjusting point entering one end point of the line of the pattern and an outline meeting an end point of the line of the pattern are orthogonal to each other. For example, the angular constraint may include a constraint such that a straight line entering the end point 410 of the neckline from the adjusting point 411 and an outline (e.g., a shoulder slope line) joining the end point 410 of the neckline meet at a right angle. In another example, the angular constraint may indicate that a straight line entering the center point 430 of the neckline from the adjusting point 431 and the second line having the center point 430 as an end point meet at a right angle. Specifically, the simulation device 1100 may determine whether the angular constraint is satisfied such that a straight line (e.g., a tangent line generated by a corresponding adjusting point on the line of the pattern) generated by at least one adjusting point entering one end point of the line of the pattern and an outline meeting an end point of the line of the pattern are orthogonal to each other.

The simulation device 1100 may satisfy the angular constraint by adjusting positions of the adjusting points 411 and 431. In another example, the simulation device 1100 may adjust the positions of the adjusting points 411 and 431 by receiving an input from a user about adjusting the adjusting points 411 and 431. In this way, the simulation device 1100 may output a result where the neckline of the front pattern and the neckline of the back pattern are naturally connected when the front pattern of the T-shirt and the back pattern of the T-shirt are combined.

In one or more embodiments, the simulation device 1100 may adjust the curvature and length of the curve including the adjusting point corresponding to the manipulation of the adjusting point. The simulation device 1100 may adjust the length of the line of the pattern using at least one adjusting point to satisfy a length constraint. The line of the pattern may include at least one of the neckline and the sleeve line.

According to an embodiment, the length constraint may indicate that the length of at least a part of another pattern combined with the pattern is the same as the length of the line of the pattern. For example, when the first pattern block (e.g., a torso pattern of a T-shirt) and a second pattern block (e.g., a sleeve pattern) are to be combined, the sleeve line of the first pattern block and the cap line of the second pattern block may be in a combined relationship where these two lines are combined. In this case, the length of the sleeve line and the length of the cap line are the same. Accordingly, the simulation device 1100 may adjust the length of the sleeve line and the length of the cap line to be the same by adjusting at least one of the lengths of the sleeve line and the cap line using the adjusting point.

Figure 5A:
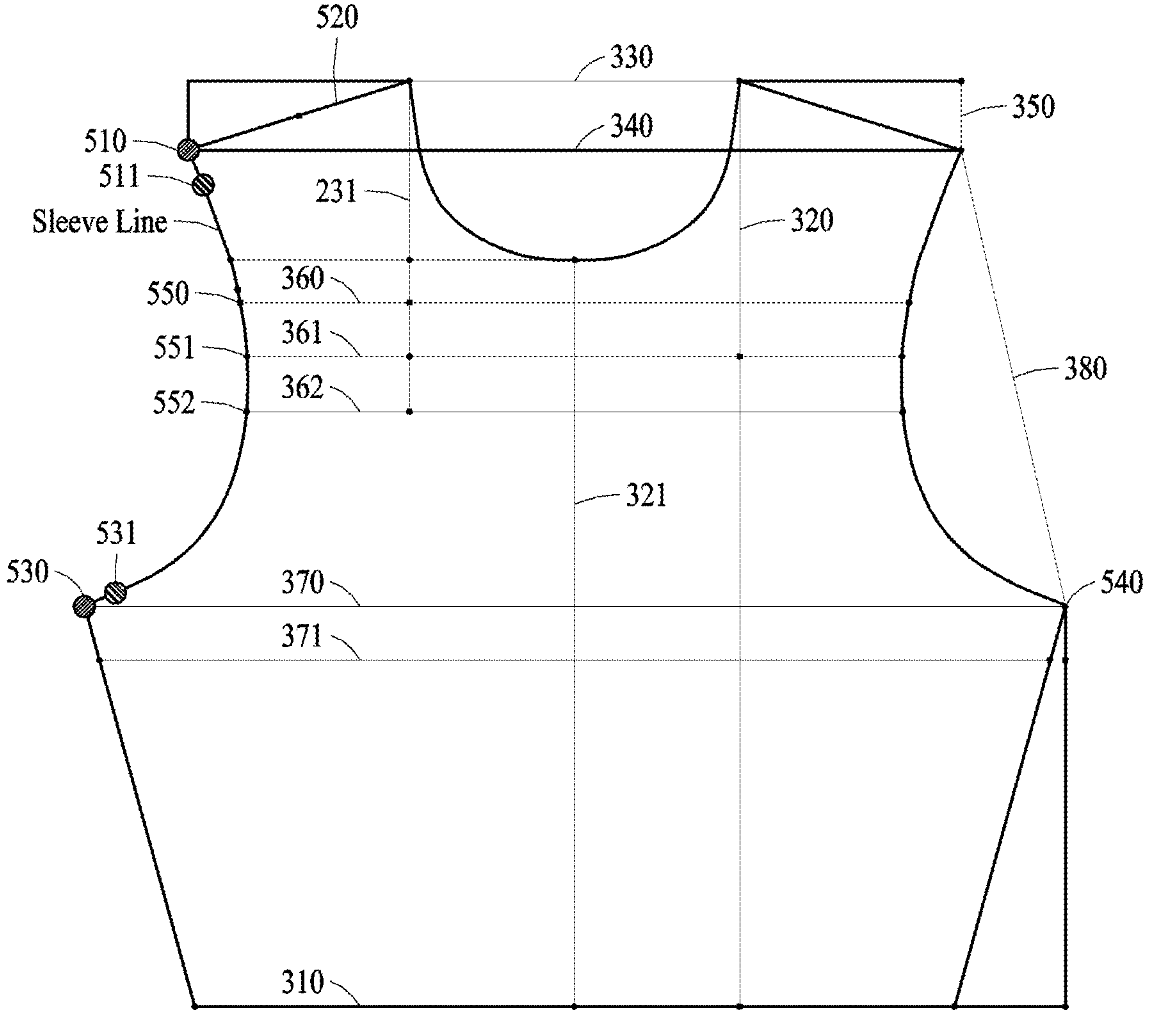
FIGS. 5A and 5B are diagrams illustrating a process of generating a sleeve line of the pattern, according to an embodiment.
Figure 5B:
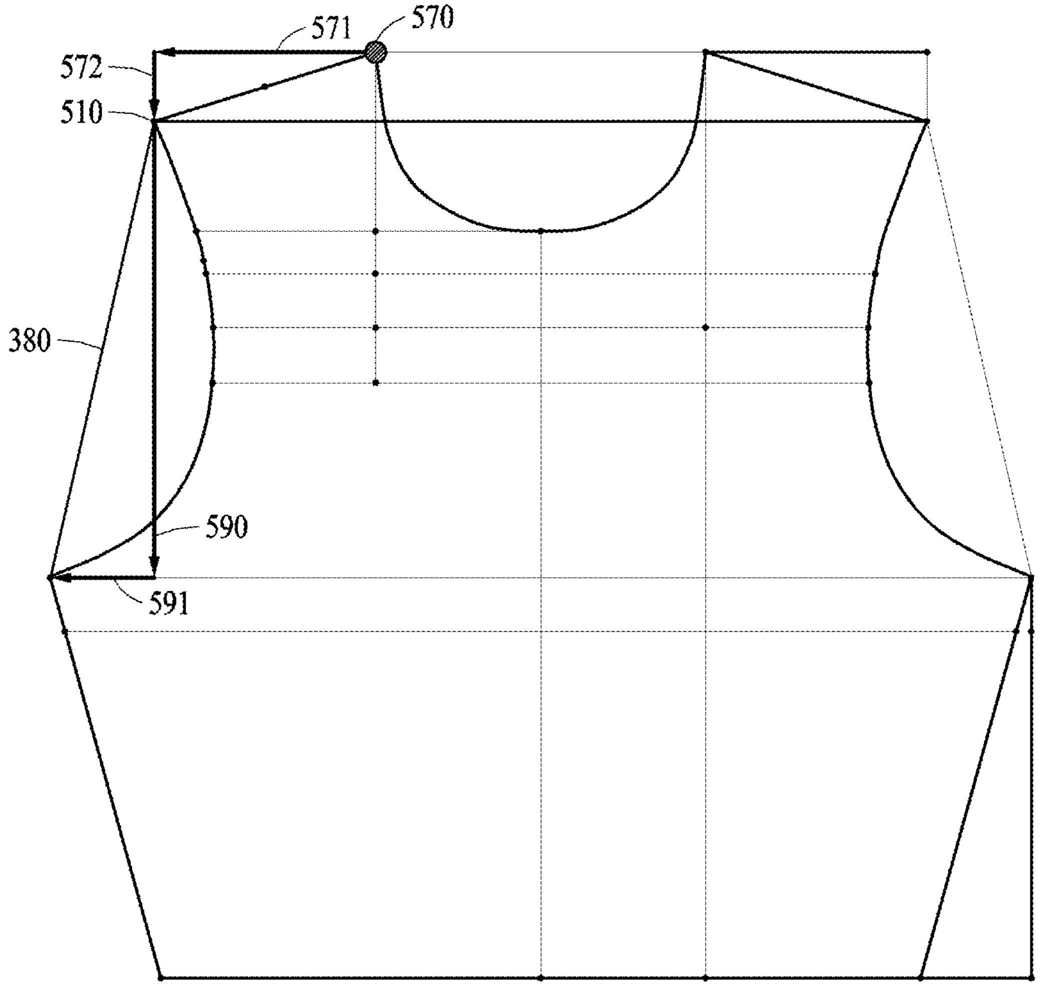

FIGS. 5A and 5B are diagrams illustrating a process of generating a sleeve line, according to an embodiment. The sleeve line starting from an end point 570 of the neckline is generated. A shoulder slope line 520 is generated from the end point 570 of the neckline. According to an embodiment, the simulation device 1100, starting from an end point 510 of the shoulder slope line, may generate the sleeve line based on at least one of the line 380 corresponding to the armhole length, the lines 360, 361, and 362 corresponding to the across length, and the lines 370 and 371 corresponding to the across chest length.

According to an embodiment, the simulation device 1100 may generate the end point 510 (e.g., the armhole) of the shoulder slope line at a location separated from the end point 570 of the neckline by a distance 571 in the first direction (e.g., horizontal direction) and separated from the end point 570 of the neckline by a distance 572 in the second direction (e.g., vertical direction). The distance 571 is determined based on the line 330 corresponding to the neck opening and the line 340 corresponding to the across shoulder length. The distance 572 is determined based on the neck depth and the line 350 corresponding to the shoulder slope height. For example, the distance 571 may be a value obtained by dividing a value obtained by subtracting the length of the line 330 corresponding to the neck opening from the length of the line 340 corresponding to the across shoulder length by 2 inches. For example, the distance 572 may be a value obtained by subtracting the length of the line 350 corresponding to the shoulder slope height from the neck depth 231. The simulation device 1100 may determine location of a point separated from the end point 510 of the shoulder slope line by a value obtained by multiplying the calculated value by a predetermined coefficient.

The lengths of the lines 360, 361, and 362 corresponding to the across length may vary based on the distances away from the HPS (e.g., the end point 570 of the neckline). The across length is a length of a line (e.g., a length of a line segment) orthogonal to the line 320 (or the line 321) with one point on the left sleeve line and one point on the right sleeve line as both end points and the sleeve line is a curve. Accordingly, the across length of the present disclosure may vary based on the distance away from the HPS. For example, the length of the line 360 corresponding to the across length may be a length of a line orthogonal to the line 320 (or the line 321) at a distance of 4 inches away from the HPS. In another example, the length of the line 361 may be a length of a line orthogonal to the line 320 (or the line 321) at a distance of 5 inches away from the HPS. In another example, the length of the line 362 may be a length of a line orthogonal to the line 320 (or the line 321) at a distance of 6 inches away from the HPS. The simulation device 1100 may generate the sleeve line using at least one of the lines 360, 361, and 362 corresponding to the across length.

According to an embodiment, the simulation device 1100 may generate an end point of the sleeve line at a distance separated from the end point 510 of the shoulder slope line by a distance 590 in the second direction (e.g., a vertical direction), and separated from the end point 510 by a distance 591 in the first direction (e.g., a horizontal direction). The distance 590 is determined based on the line 340 corresponding to the across shoulder length and the lines 370 and 371 corresponding to the across chest length. The distance 591 is determined based on the line 340 corresponding to the across shoulder length, the lines 370 and 371 corresponding to the across chest length, and the line 380 corresponding to the armhole length. For example, the distance 591 may be a value obtained by subtracting the length of the line 340 corresponding to the across shoulder length from the length of the line 370 corresponding to the across chest length and dividing by 2. For example, the distance 590 may be a square root of a value obtained by subtracting a square of the distance 591 from a square of the length of the line 380 corresponding to the armhole length. The simulation device 1100 may generate the end point 530 of the sleeve line at a position away from the end point 510 of the shoulder slope line by a value obtained by multiplying the calculated value by a coefficient. According to an embodiment, the simulation device 1100 may generate the sleeve line by connecting the end point 530 of the sleeve line to the end point 510 of the shoulder slope line.

When the received measurement parameters include the length of the line 371 corresponding to the across chest length, the simulation device 1100 may calculate the length of the line 370 corresponding to the across chest length, which is a distance between an armhole 530 and an armhole 540, based on the length of the line 371 corresponding to the across chest length. The armhole 530 and the armhole 540 in FIG. 5A may refer to one end point of the armhole for convenience, and a length of the shortest line segment between each end point may refer to as a distance between the armhole 530 and the armhole 540. The line 371 corresponding to the across chest length may be a line at a predetermined distance away from the armhole 530. For example, the line 371 corresponding to the across chest length may be a line orthogonal to the line 320 (or the line 321) which is 1 inch below the armhole 530. The simulation device 1100 may determine a position of the end point 530 of the sleeve line using the length of the line 370 corresponding to the calculated across chest length.

According to an embodiment, the simulation device 1100 may adjust the curvature of the line of the pattern using at least one adjusting point 511 or 531 for satisfying the angular constraint. The line of the pattern may include at least one of the neckline and the sleeve line. For example, the angular constraint may indicate that a straight line entering the end point 510 of the shoulder slope line from the adjusting point 511 and the shoulder slope line 520 meet at a right angle. In another example, the angular constraint may indicate that a straight line entering the end point 530 of the sleeve line from the adjusting point 531 and a line 560 meet at a right angle.

The simulation device 1100 may satisfy the angular constraint by adjusting locations of the adjusting points 511 and 531. In another example, the simulation device 1100 may adjust the locations of the adjusting points 511 and 531 by receiving an input about moving the locations of the adjusting points 511 and 531 from a user. In this way, the simulation device 1100 may output a result where the sleeve line of the front pattern and the sleeve line of the back pattern are naturally connected when the front patter of the T-shirt and the back pattern of the T-shirt are combined.

Figure 6:
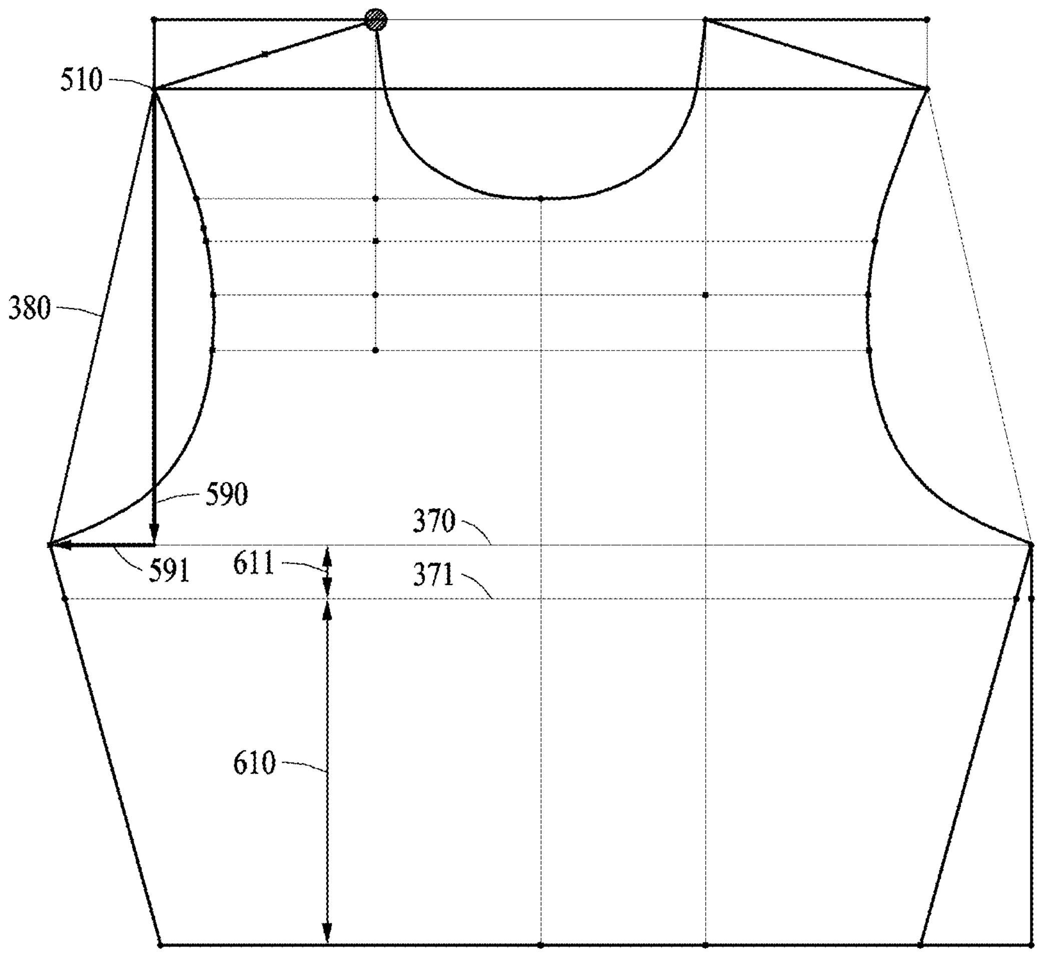
FIG. 6 is a diagram illustrating a method of calculating a distance between an armhole and an armhole, according to an embodiment.

FIG. 6 is a diagram illustrating a method of calculating a distance between an armhole and an armhole, according to an embodiment. Although it is more accurate to specify the across chest length as the length of the line 370, in some cases, the across chest length may be received as the length of the line 371 at a predetermined distance (e.g., 1 inch) away from the armhole. When the simulation device 1100 receives the length of the line 371 as a measurement parameter, the simulation device 1100 may estimate the length of the line 370, which is the distance between the armhole and the armhole based on the length of the line 371. The estimated length of the line 370 may be the across chest length. A method of estimating the length of the line 370 corresponding to the across chest length is described hereafter in detail.

The simulation device 1100 may estimate a distance of the line 370 based on the length of the line 371 and the pattern height. The simulation device 1100 may verify the estimated distance of the line 370 based on the armhole length. The simulation device 1100 may re-estimate the length of the line 370 according to a result of verifying or may determine the estimated distance of the line 370 as the across chest length. More specifically, when the length of the line 371 is received, the simulation device 1100 may not calculate the distance 590 and the distance 591. Since there is no information about the distance 590 and the distance 591, the simulation device 1100 may not determine a location of the point 530 for generating the sleeve line.

Accordingly, the simulation device 1100 may estimate a distance 610 from the pattern hem to the line 371 in a certain range. For example, the distance 610 may be a median value. When the distance 610 from the pattern hem to the line 371 is the median value, the simulation device 1100 may calculate a distance from the pattern hem to the line 370 because the line 370 and the line 371 are separated by a certain distance. For example, the line 370 and the line 371 may be separated by 1 inch. The simulation device 1100 may estimate the length of the line 370 based on the distance 610 and the length of the line 371. The simulation device 1100 may calculate the distance 590 and the distance 591 based on the estimated length of the line 370.

The simulation device 1100 may calculate the length of the line 380 corresponding to the armhole length based on the distance 590 and the distance 591. The simulation device 1100 may determine whether to recalculate the length of the line 370 based on a difference between the armhole length included in the received measurement parameter and the calculated armhole length (the length of the line 380). For example, when the difference between the armhole length included in the measurement parameter and the calculated armhole length (the length of the line 380) is in an allowance range, the simulation device 1100 may determine the estimated length of the line 370 as the distance between the armhole and the armhole. When the difference is greater than a certain reference, the simulation device 1100 may determine the distance 610 from the pattern hem to the line 371 to be in an adjusted range (e.g., when a certain range is [I, pattern height], the adjusted range is [median value+C, pattern height]), and then may re-estimate the length of the line 370 where C is any number. When the difference is less than a certain reference, the simulation device 1100 may determine the distance 610 from the pattern hem to the line 371 to be in an adjusted range (e.g., when a certain range is [I, pattern height]), the adjusted range is [1, median value−C]), and then may re-estimate the length of the line 370. Such a method may be perfumed using a binary search.

Figure 7:
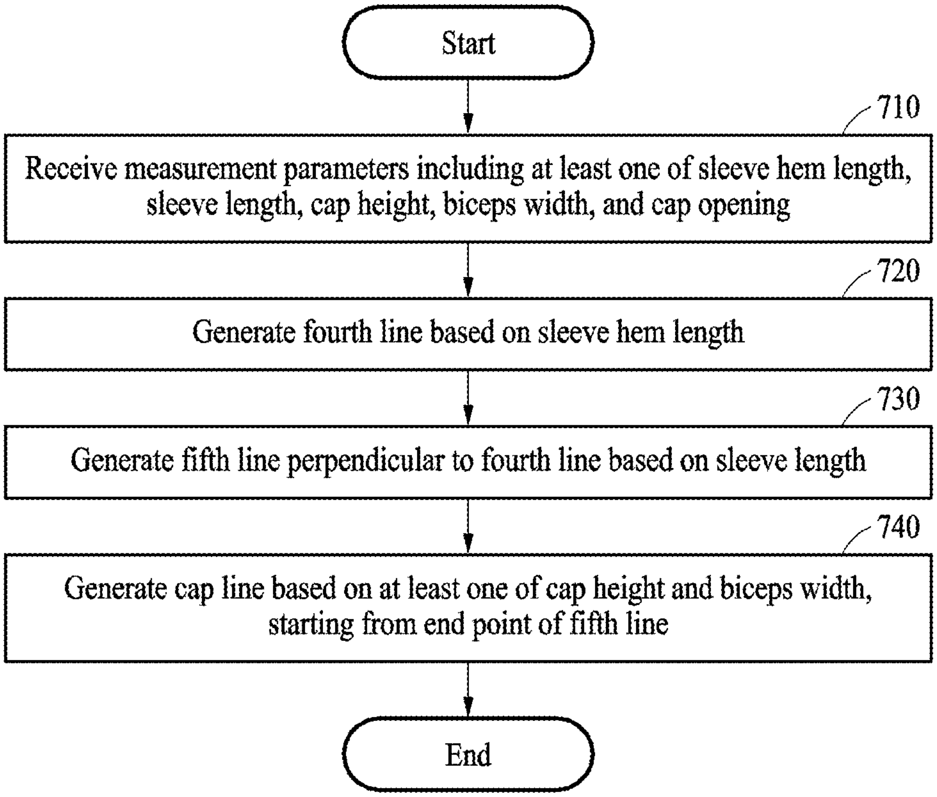
FIG. 7 is a flowchart illustrating a method of generating a pattern of a second pattern block, according to an embodiment.

FIG. 7 is a flowchart illustrating a method of generating a pattern corresponding to a second pattern block, according to an embodiment. According to an embodiment, the simulation device 1100 may receive different measurement parameters depending on a pattern block. For example, the second pattern block may be a sleeve pattern and measurement parameters corresponding to the sleeve pattern may be received, for example, using a user interface.

In operation 710, measurement parameters including at least one of a sleeve hem length, a sleeve length, a cap height, a biceps width, and a cap opening may be received. The sleeve hem length refers to a hem length of the sleeve and corresponds to the length of line 810 of FIG. 8. The sleeve length refers to a length from the sleeve hem to a center point of the cap and corresponds to the length of line 820 of FIG. 8. The cap height refers to a length from line 850 indicating the biceps width to the center point of the cap and corresponds to line 830 of FIG. 8. The biceps width refers to the circumferential length of the sleeve enclosing the arm of a wearer and corresponds to lines 850 and 851 of FIG. 8. The cap opening refers to the length of a straight line that connects one point of the cap line to one point opposite to the cap line and corresponds to a line 840 of FIG. 8.

In operation 720, a hem line is generated based on the sleeve hem length. The simulation device 1100, in operation 730, generates a center line perpendicular to the hem line based on the sleeve length.

According to an embodiment, the simulation device 1100, in operation 740 generates a cap line based on at least one of the cap height and the biceps width, starting from an end point of the sleeve center line. An example method of generating the cap line is described in detail below with reference to FIG. 9.

Figure 8:
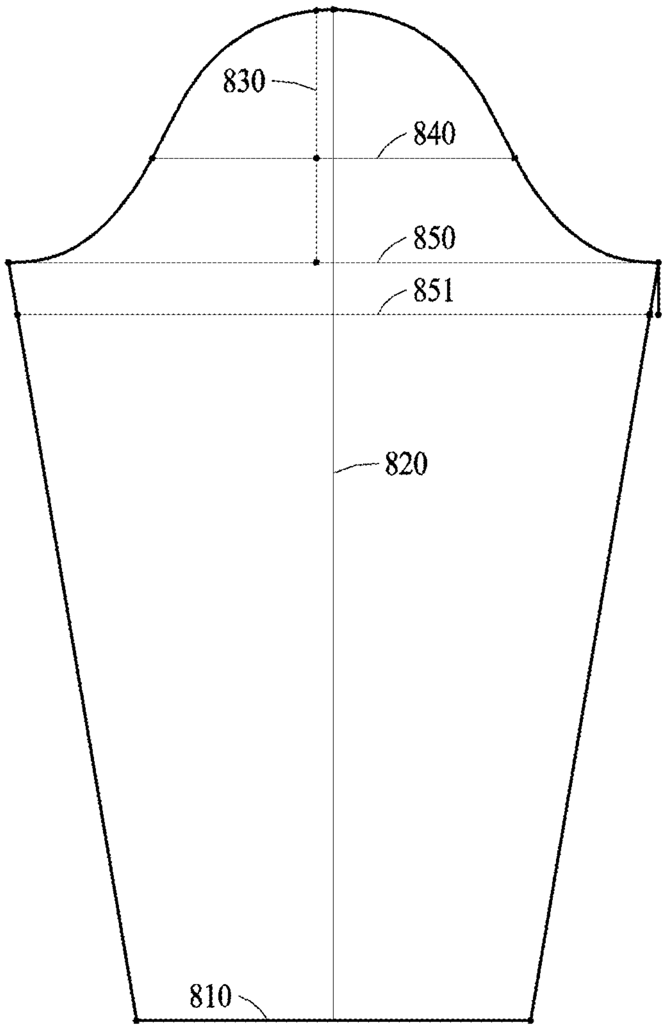
FIG. 8 is a diagram illustrating measurement parameters corresponding to the second pattern block, according to an embodiment.

FIG. 8 is a diagram illustrating measurement parameters corresponding to the second pattern block, according to an embodiment. Since the measurement parameter corresponding to the second pattern block is described with reference to FIG. 7, a detailed description thereof is omitted for in FIG. 8 for the sake of brevity.

Figure 9:
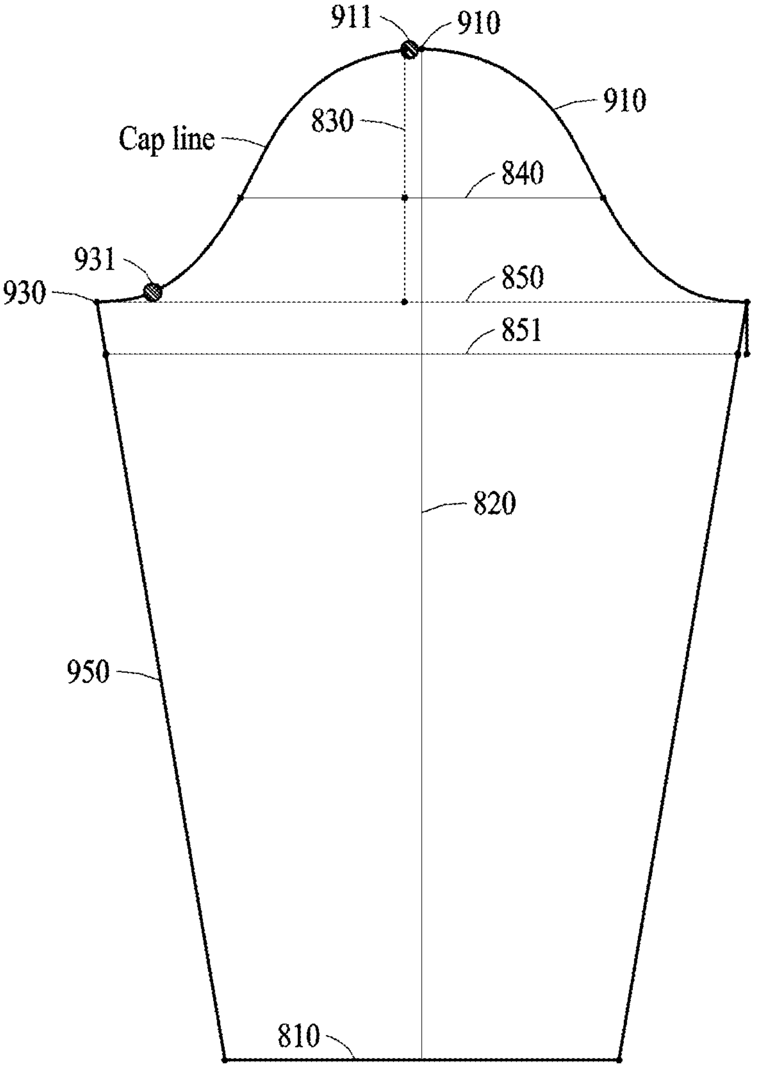
FIG. 9 is a diagram illustrating a process of generating a cap line, according to an embodiment.

FIG. 9 is a diagram illustrating a process of generating a cap line, according to an embodiment. According to an embodiment, the simulation device 1100 generates the sleeve hem line 810 based on the sleeve hem length. The simulation device 1100 generates the sleeve center line 820 perpendicular to the sleeve hem line 810 based on the sleeve length. The sleeve center line 820 may refer to a line that perpendicularly intersects with the sleeve hem line 810 at a central point of the sleeve hem line 810.

According to an embodiment, the simulation device 1100, starting from an end point 910 of the sleeve center line, may determine a location moved by a distance determined based on the biceps width in the first direction and moved by a distance determined based on the cap height in the second direction as an end point 930 of the cap line. For example, the simulation device 1100 may determine a location moved by a distance corresponding to half of the biceps width in the first direction and moved by the cap height in the second direction as the end point 930 of the cap line. In addition, the simulation device 1100 may generate the line 840 having the received cap opening. The simulation device 1100 may generate the cap line by connecting the end point of the line 840, the end point 930 of the cap line, and the end point 910 of the sleeve center line.

The simulation device 1100 may receive the length of the line 851 instead of the length of the line 850 while receiving the measurement parameter. In this case, the simulation device 1100 may estimate the length of the line 850 based on the length of the line 851. A method of estimating the length of the line 850 may be the same as or similar to that described with reference to FIG. 6. This may be a process in which the simulation device 1100 estimates a distance between the line 810 and the line 851 in a certain range through the fact that the line 850 and the line 851 are separated by a certain distance (e.g., "1" inch) and finally calculates the length of the line 810.

According to an embodiment, the simulation device 1100 may satisfy the angular constraint and the length constraint in the same or similar manner as that of the first pattern block using adjusting points 911 and 931.

The simulation device 1100 may adjust a location of the adjusting point 910 such that a straight line entering the adjusting point 910 from the adjusting point 911 and the line 830 are perpendicular to each other for satisfying the angular constraint. In another example, the simulation device 1100 may adjust a location of the adjusting point 951 such that a straight line entering the adjusting point 930 from the adjusting point 931 and a line 950 are perpendicular to each other for satisfying the angular constraint.

Since the simulation device 1100 may also adjust the length of the cap line by adjusting the adjusting point, the length constraint may be satisfied. The simulation device 1100 may adjust the locations of the adjusting points 911 and 931 to match the length of the sleeve line of the first pattern block to the length of the cap line of the second pattern block.

FIG. 10 is a diagram illustrating a graphical user interface 1000 for receiving input on measurement parameters of the first pattern block from a user, according to an embodiment. FIG. 10 illustrates a high-level classification 1010 of patterns, a T-shirts pattern block 1011 that is currently highlighted as being selected, a pattern block sub-classification 1030, a display area 1050 for displaying a pattern block shape in a 2D shape, and a user interface area for specifying measurement parameters 1070. The user interface area 1070 includes section 1071 for specifying a shoulder seam length, section 1072 for specifying a neck drop, section 1073 for specifying a neck opening, section for specificint 1074 a center front, section 1075 for specifying a side seam, section 1076 for specifying an across front, and a section for specifying an armhole drop. These measurement parameters and user interface configuration are merely illustrative and other components may be added to the user interface.

The pattern block large classification 1010 shows T-shirts, shirts, pants, skirts, dresses, jackets, and coats. The description of FIG. 10 is only an example, and other components may be added or omitted thereto or therefrom. The simulation device 1100 may receive a selection input for T-shirts 1011 in the pattern block large classification 1010. In this case, the simulation device 1100 may output, on a screen, the pattern block sub-classification 1030 object related to the T-shirts 1011. The pattern block related to the T-shirts 1011 may include a Basic, Basic+, Raglan, Ribbing, and the like. When the simulation device 1100 receives a selection input for the Basic, the simulation device 1100 may output a pattern block corresponding to a basic configuration of a T-shirt to the display area 1050.

According to an embodiment, the simulation device 1100 may receive a user input for a plurality of measurement parameters through the user interface area 1070. When a measurement parameter in the user interface area 1070 is selected, an area corresponding to the selected measurement parameter may be highlighted in the display area 1050 to be distinguishable from other areas. For example, the color or transparency may be set different from other parts of the pattern block.

According to an embodiment, when a user provides a measurement parameter through the user interface area 1070, the simulation device 1100 may generate a pattern according to the measurement parameter. Specifically, upon receiving measurement parameters, points that are connected to form an outline of the pattern are generated based on the measurement parameters and pattern information. These points may be assigned to different types depending on which part of the pattern they belong. For example, an outline formed by connecting a first set of points may become a neck line of a pattern while another outline formed by connecting a second set of outline lines may become a shoulder line of the same pattern. In such example, the first set of points is referred to as neck line type points and the second set of points is referred to shoulder line type points. A point list including entire list of points and a point type list including all types of points (e.g., neck line type points and shoulder line points) are generated. By generating and assigning the points, the simulation device 1100 may automatically generate a pattern corresponding to the received measurement parameters and pattern information. In FIG. 10, an example of a pattern for a top garment is described, but the simulation device 1100 of the present disclosure may be applied to patterns for other garments such as pants patterns, skirt patterns, and outerwear patterns.

In one or more embodiments, at least one measurement parameter may be modified by providing one or more updated values to user interface area 1070. Upon receiving a user approval (e.g., by user's pressing of "OK" button) or dynamically upon receiving of the updated values, the pattern shown in the display area 1050 may be updated automatically. In this way, the user may check the generated pattern displayed in user interface area 1070 and fine tune the design of the patterns by updating the velus in the user interface area 1070.

The pattern information may include information determined based on at least one of a type of a pattern, a half completion, and a symmetrical type. The type of the pattern may refer to a type of a pattern to be generated. For example, when the pattern is a top pattern, the type of the pattern may include a top front pattern, a top back pattern, a sleeve pattern, a neckline pattern, and the like. The half completion indicates whether the received measurement parameters are for an area corresponding to a half of the pattern (e.g., a left or right half of the pattern). For example, when the half completion is indicated confirmed based on the measurement parameters of the pattern, the simulation device 1100 may generate a half of the pattern. In this case, the simulation device 1100 may duplicate the other symmetric half of the pattern or generate a pattern with half of the pattern extending to the symmetrical pattern. In one or more embodiments, the simulation device 1100 may present an option to display only the half of the pattern on the entire pattern. The symmetrical type indicates whether a pattern is of a symmetrical type. If the pattern is of a symmetrical type, the simulation device 1100 may generate an entire pattern by unfolding a half of the pattern along on a symmetry line.

Figure 11:
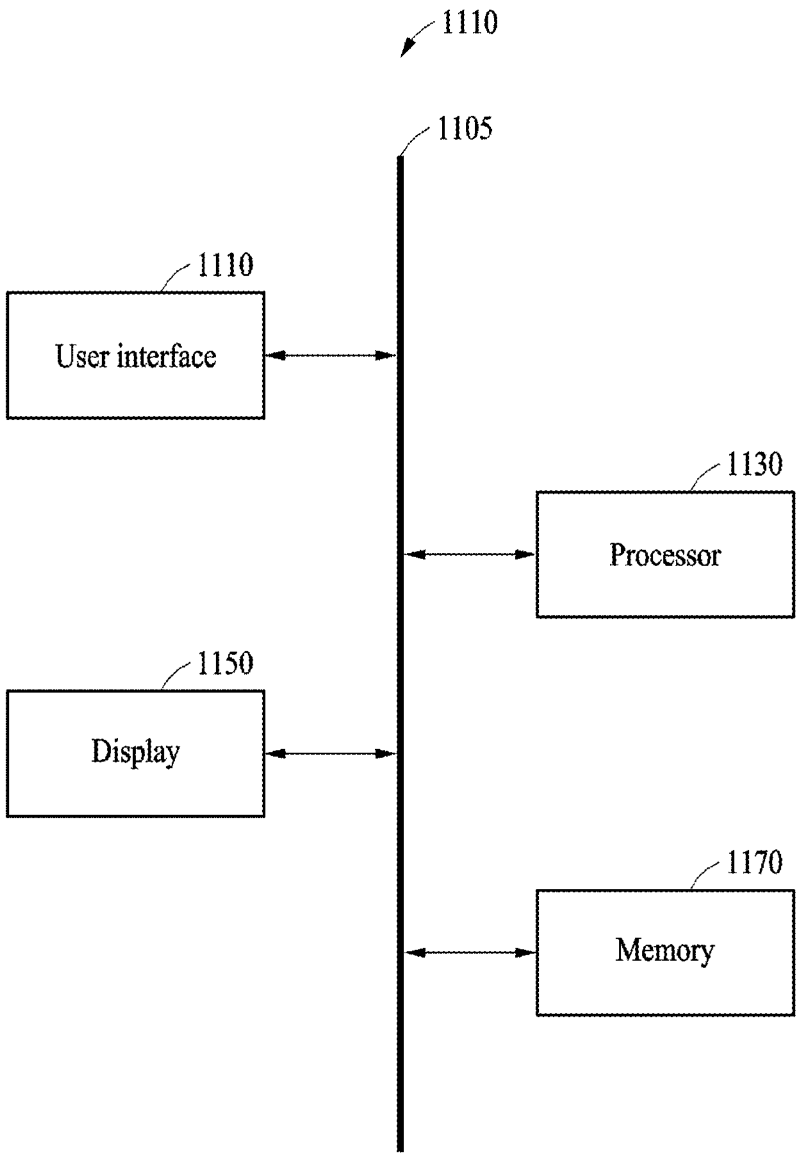
FIG. 11 is a block diagram illustrating a simulation device, according to an embodiment.

FIG. 11 is a block diagram illustrating a simulation device according to various embodiments. According to an embodiment, the simulation device 1100 may be a server. According to another embodiment, the simulation device 1100 may be a user terminal (e.g., a mobile device, a desktop, a laptop, a personal computer, etc.). Referring to FIG. 11, according to an embodiment, the simulation device 1100 may include a user interface 1110, a processor 1130, a display 1150, and a memory 1170. The user interface 1110, the processor 1130, the display 1150, and the memory 1170 may be connected to one another through a communication bus 1105.

The user interface 1110 may receive a user input for each of measurement parameters.

The display 1150 may display a simulation result generated by the processor 1130. The simulation device 1100 may output the user interface shown in FIG. 10.

The memory 1170 may store the generated simulation result. In addition, the memory 1170 may store a variety of information generated in the processing process of the processor 1130 described above. In addition, the memory 1170 may store a variety of data and programs. The memory 1170 may include a volatile memory or a non-volatile memory. The memory 1170 may include a high-capacity storage medium such as a hard disk to store a variety of data.

In addition, the processor 1130 may perform at least one method described with reference to FIGS. 1 to 10, or an algorithm corresponding to at least one method. The processor 1130 may be a hardware-implemented data processing device having a circuit that is physically structured to execute desired operations. The desired operations may include, for example, code or instructions in a program. The processor 1130 may include, for example, a central processing unit (CPU), a graphics processing unit (GPU), or a neural network processing unit (NPU). For example, the simulation device 1100 that is implemented as hardware may include a microprocessor, a CPU, a processor core, a multi-core processor, a multiprocessor, an application-specific integrated circuit (ASIC), and a field-programmable gate array (FPGA).

The processor 1130 may execute a program and control the simulation device 1100. Code of the program executed by the processor 1130 may be stored in the memory 1170.

The methods according to the examples may be recorded in non-transitory computer-readable media including program instructions to implement various operations of the examples. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While the embodiments are described with reference to drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A computer-implemented method of automatically generating a pattern of a garment, the method comprising:

receiving a pattern hem length, a pattern height, a neckline parameter, and a sleeve line parameter;

generating a first line with a length corresponding to the received pattern hem length, the first line representing a hem of the pattern;

determining an end point of a second line, the end point of the second line being separated from a point of the first line by a distance corresponding to the received pattern height in a direction forming an angle relative to the first line, to generate the second line extending from the point of the first line;

determining an end point of a neckline, the end point of the neckline being determined based on the end point of the second line and the received neckline parameter, to generate the neckline extending from the end point of the second line;

determining an end point of at least one shoulder slope line based on the end point of the neckline and the received neckline parameter, to generate the at least one shoulder slope line extending from the end point of the neckline;

determining an end point of at least one sleeve line, the end point of the at least one sleeve line being separated from the end point of a corresponding shoulder slope line by a first distance in a first direction and by a second distance in a second direction, the first distance being determined based on the sleeve line parameter, and the second distance being determined based on the first distance such that a distance between the end point of the corresponding shoulder slope line and the end point of the at least one sleeve line corresponds to an armhole length, to generate the at least one sleeve line extending from the end point of the corresponding shoulder slope line;

forming the pattern to include the first line, the neckline, the at least one shoulder slope line and the at least one sleeve line; and displaying the formed pattern.

2. The method of claim 1, further comprising:

displaying user interface elements for receiving the pattern hem length, the pattern height, and the sleeve line parameter, wherein the pattern hem length, the pattern height, and the sleeve line parameter are received via the user interface elements;

receiving an update to at least one of the pattern hem length, the pattern height, and the sleeve line parameter responsive to displaying the formed pattern;

forming an updated pattern modified according to the received update; and displaying the updated pattern.

3. The method of claim 2, wherein the neckline parameter is an across shoulder length, a shoulder slope length, a neck depth or a neck opening; and the sleeve line parameter is an armhole length, an across length or an across chest length.

4. The method of claim 2, wherein the pattern height is (i) a high point shoulder (HPS) length representing a length from the hem to a highest point of the pattern corresponding to a shoulder of a wearer or (ii) a center height representing a length from the hem to a center of the neckline.

5. The method of claim 2, wherein the generating of the neckline extending from the end point of the second line comprises:

determining a location separated from a high point shoulder (HPS) by a first distance in a first direction and separated from the HPS by a second distance in a second direction as a center point of the neckline when an HPS length is used as the pattern height, wherein the first distance is determined from a neck opening and the second distance is determined from a neck depth; and generating the neckline from the determined center point.

6. The method of claim 2, wherein the generating of the neckline extending from the end point of the second line comprises:

determining a location separated from the end point of the second line corresponding to a center of the neckline by a first distance in a first direction and separated from the end point of the second line by a second distance in a second direction as the end point of the neckline that contacts a shoulder line when a center height is used as the pattern height, wherein the first distance is determined from a neck opening and the second distance is determined from a neck depth; and generating the neckline from the determined end point.

7. The method of claim 1, further comprising:

responsive to receiving an across chest length at a predetermined distance away from an armhole of the pattern as the neckline parameter, estimating a distance from the armhole to another armhole at an opposite side based on the across chest length and the pattern height;

verifying the estimated distance based on the armhole length; and re-estimating the distance from the armhole to the other armhole according to the verification.

8. The method of claim 1, further comprising:

adjusting a curvature of at least one of the neckline or the sleeve line by manipulating at least one adjusting point.

9. The method of claim 8, wherein the adjusting of the curvature comprises determining whether an angular constraint is satisfied using the at least one adjusting point, wherein the angular constraint indicates that a straight line generated by the at least one adjusting point entering an end point of the neckline or the sleeve line and an outline of the pattern meet perpendicularly.

10. The method of claim 1, further comprising:

adjusting a length of at least one of the neckline or the sleeve line by manipulating at least one adjusting point.

11. The method of claim 10, wherein the adjusting of the length comprises determining whether a length constraint is satisfied, wherein the length constraint indicates that the length of at least one of the neckline or the sleeve line matches a length of a neckline or a sleeve line of another pattern combined with the pattern.

12. A computer-implemented method of automatically generating a pattern of a garment, the method comprising:

receiving a sleeve hem length, a sleeve length and a cap parameter, the cap parameter comprising a biceps width and a cap height;

generating a hem line of a sleeve of the pattern, the hem line having a length corresponding to the sleeve hem length;

determining an end point of a center line, the end point of the center line being separated from a point of the hem line by a distance corresponding to the sleeve length in a direction perpendicular to the hem line, to generate the center line extending from the point of the hem line;

determining an end point of a cap line, the end point of the cap line being separated from the end point of the center line by a first distance in a first direction and by a second distance in a second direction, the first distance being determined based on the biceps width and the second distance being determined based on the cap height, to generate the cap line extending from the end point of the center line;

forming the pattern to include the hem line and the cap line; and displaying the formed pattern.

13. The method of claim 12, further comprising:

displaying user interface elements for receiving the sleeve hem length, the sleeve length and the cap parameter;

receiving an update to at least one of the sleeve hem length, the sleeve length and the cap parameter responsive to displaying the formed pattern;

forming an updated pattern modified according to the received update; and displaying the updated pattern.

14. A non-transitory computer readable storage medium storing instructions thereon, the instructions when executed by a processor cause the processor to:

receive a pattern hem length, a pattern height, a neckline parameter, and a sleeve line parameter;

generate a first line with a length corresponding to the received pattern hem length, the first line representing a hem of the pattern;

determine an end point of a second line, the end point of the second line being separated from a point of the first line by a distance corresponding to the received pattern height in a direction forming an angle relative to the first line, to generate the second line extending from the point of the first line;

determine an end point of a neckline, the end point of the neckline being determined based on the end point of the second line and the received neckline parameter, to generate the neckline extending from the end point of the second line;

determine an end point of at least one shoulder slope line based on the end point of the neckline and the received neckline parameter, to generate the at least one shoulder slope line extending from the end point of the neckline;

determine an end point of at least one sleeve line, the end point of the at least one sleeve line being separated from the end point of a corresponding shoulder slope line by a first distance in a first direction and by a second distance in a second direction, the first distance being determined based on the sleeve line parameter, and the second distance being determined based on the first distance such that a distance between the end point of the corresponding shoulder slope line and the end point of the at least one sleeve line corresponds to an armhole length, to generate the at least one sleeve line extending from the end point of the corresponding shoulder slope line;

form the pattern to include the first line, the neckline, the at least one shoulder slope line and the at least one sleeve line; and display the formed pattern.

15. The computer readable storage medium of claim 14, further storing instructions that cause the processor to:

display user interface elements for receiving the pattern hem length, the pattern height, and the sleeve line parameter, wherein the pattern hem length, the pattern height, and the sleeve line parameter are received via the user interface elements;

receive an update to at least one of the pattern hem length, the pattern height, and the sleeve line parameter responsive to displaying the formed pattern;

form an updated pattern modified according to the received update; and display the updated pattern.

16. A pattern of a garment generated by an automatic process comprising:

receiving a pattern hem length, a pattern height, a neckline parameter, and a sleeve line parameter;

generating a first line with a length corresponding to the received pattern hem length, the first line representing a hem of the pattern;

determining an end point of a second line, the end point of the second line being separated from a point of the first line by a distance corresponding to the received pattern height in a direction forming an angle relative to the first line, to generate the second line extending from the point of the first line;

determining an end point of a neckline, the end point of the neckline being determined based on the end point of the second line and the received neckline parameter, to generate the neckline extending from the end point of the second line;

determining an end point of at least one shoulder slope line based on the end point of the neckline and the received neckline parameter, to generate the at least one shoulder slope line extending from the end point of the neckline;

determining an end point of at least one sleeve line, the end point of the at least one sleeve line being separated from the end point of a corresponding shoulder slope line by a first distance in a first direction and by a second distance in a second direction, the first distance being determined based on the sleeve line parameter, and the second distance being determined based on the first distance such that a distance between the end point of the corresponding shoulder slope line and the end point of the at least one sleeve line corresponds to an armhole length, to generate the at least one sleeve line extending from the end point of the corresponding shoulder slope line; and forming the pattern to include the first line, the neckline, the at least one shoulder slope line and the at least one sleeve line.

* * * * *